April 13, 1948.  W. R. FETZER  2,439,384
SOLID CORN SYRUP MANUFACTURE
Filed Jan. 27, 1942
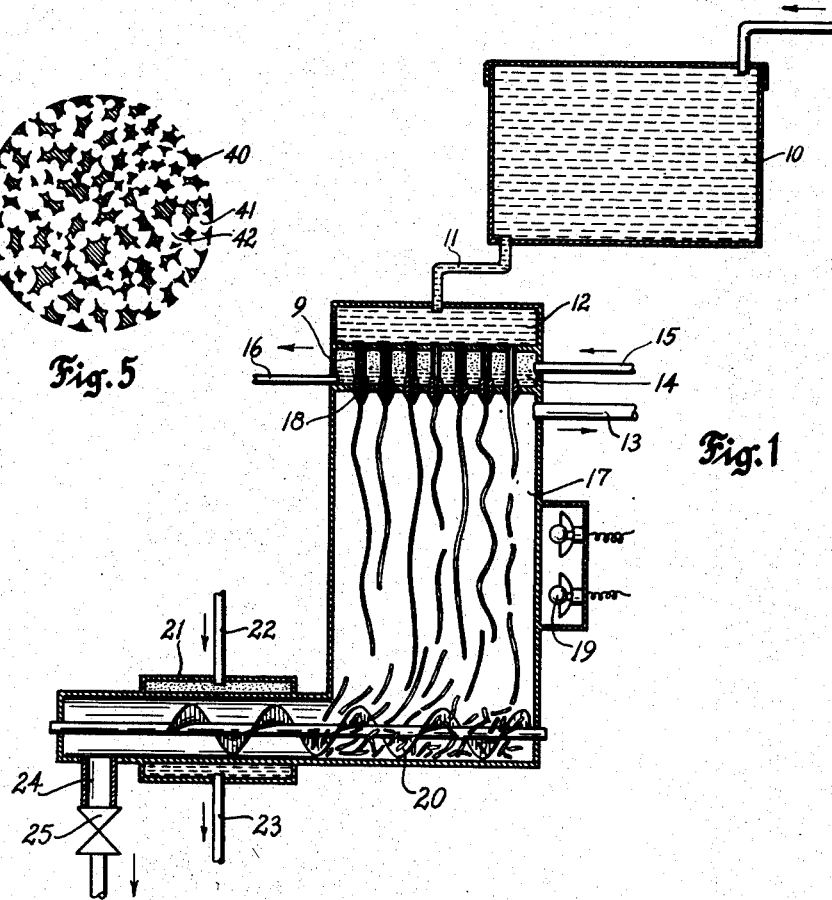
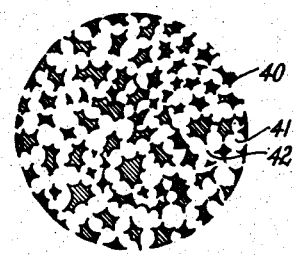
Fig. 5
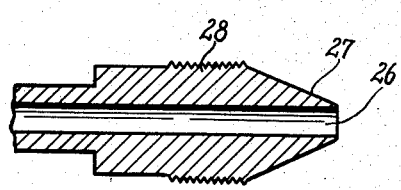
Fig. 2
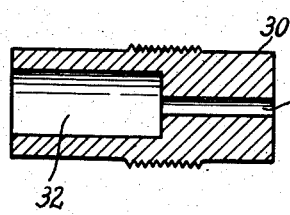
Fig. 3
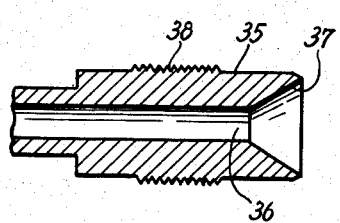
Fig. 4
INVENTOR.
Walter R. Fetzer
BY
Pineles & Greene
ATTORNEYS.

Patented Apr. 13, 1948

2,439,384

UNITED STATES PATENT OFFICE 2,439,384

SOLID CORN SYRUP MANUFACTURE

Walter R. Fetzer, Clayton, Mo., assignor to Union Starch & Refining Company, Columbus, Ind., a corporation of Indiana Application January 27, 1942, Serial No. 428,344

16 Claims. (Cl. 127—58)

My invention relates to a novel process for converting liquid corn syrup to solid dehydrated corn syrup and more particularly my invention relates to the process of producing solid corn syrup by the extrusion of corn syrup through a small orifice in the form of a preheated stream into a vacuum chamber evacuated to about 29" or better so as to cause the extruded corn syrup to expand in the form of a cylindrical rope-like structure having intercommunicating cells from which substantially all moisture is removed quickly and easily by the high vacuum.

Corn syrup is the thick viscous syrup obtained from the incomplete hydrolysis of starch after proper purification and concentration. The degree of hydrolysis is determined by the amount of reducing sugars present, calculated as dextrose, which when expressed on a dry substance basis, is called dextrose equivalent, or, more simply, D. E. The bulk of the commercial syrup is approximately 42 D. E. The carbohydrate composition of 42 D. E. corn syrup is substantially as follows:

|  | Per cent |
|---|---|
| Dextrin | 37.0 |
| Higher sugars | 20.2 |
| Maltose | 20.8 |
| Dextrose | 22.0 |

It is the dextrin, a colloid, which gives corn syrup its viscous character and which makes corn syrup a highly desirable product for many uses. Corn syrup is marketed as a concentrated syrup, according to degrees Baumé, ranging from 42 to 46°, the bulk being 43°. These concentrated syrups still contain substantial quantities of water as follows:

|  | Per cent |
|---|---|
| 42° | 21.7 |
| 43° | 19.7 |
| 44° | 17.7 |
| 45° | 15.7 |
| 46° | 13.7 |

In the shipment of corn syrup, freight must be paid on this water.

It has long been recognized that dried or dehydrated corn syrup would eliminate freight charges on water, effect economies on shipping containers and extend the use of corn syrup into fields where the water of the heavy syrup prohibits its use, such as in the manufacture of ice cream.

Dehydrated corn syrup is now produced by the spray drying process. Spray drying consists in atomizing dilute corn syrup into a large chamber, where it is exposed to large volumes of heated air which removes the water from the droplets containing corn syrup. This process has many disadvantages from a commercial standpoint. Among these disadvantages are (1) the necessity for use of low density or dilute solutions of corn syrup which, in turn, necessitates removal of large quantities of water; (2) the use of high pressures in spraying equipment to secure atomization; (3) the necessity for heating and employing large quantities of heated air for evaporation of water; (4) the necessity and difficulties of protection against loss of finely divided dried corn syrup carried along with spent air.

In addition to these practical commercial difficulties of the process, there is also the fundamental functional disadvantages that the atomized corn syrup is dried from the outside in upon its contact and exposure to the hot air. This results in a case hardening effect in which the outer skin or surface of the atomized corn syrup particles is drier than the interior or core of the particles.

It is the object of my invention to continuously produce dehydrated corn syrup of low moisture content in an economical and efficient manner with these advantages:

(a) The apparatus I employ is simple, compact, troublefree, and relatively inexpensive;

(b) Dehydration is effected in a vacuum, so that water is removed economically;

(c) Corn syrups of high density or low moisture content are employed, thus reducing the amount of water to be removed;

(d) The converted form is such that dust formation or loss by entrainment is reduced to a minimum;

(e) The converted form is such that when crushed it yields segments of spheres, wherein surface to mass is reduced, thus curtailing moisture re-absorption;

(f) The converted form is such that moisture is removed from inside out, thus preventing case hardening.

To accomplish these objects, I take advantage of the dextrin content of corn syrup. Dextrin is a colloid which gives corn syrup unusual properties. Upon dehydration, the mass becomes elastic and with further dehydration, the dextrin sets to form. Thus, I have found that if corn syrup is properly heated and extruded through an orifice or nozzle into a chamber under vacuum, the thread of corn syrup will expand into an open intercommunicating cell rope as moisture is released, retaining its intercommunicating cell expanded form while it sets. The setting is in effect the dehydration of the dextrin which hardens and sets as it is dehydrated. Moisture from the expanded porous rope is removed readily. Since the expanded or rope form is retained, entrainment is at a minimum.

In such a process, the amount of dehydration depends upon several factors. One of these is the moisture content of the corn syrup. The higher the density, or Baumé, the smaller the quantity of moisture to be removed. Another is the temperature or heat capacity of the syrup. This, in turn, is limited by the boiling point of the syrup. If temperatures are desired above the atmospheric boiling point, the syrup must be under pressure to prevent boiling. Another factor is the shape of the orifice or nozzle and the rate of product removed from the orifice or nozzle.

In general, the extruded rope should be formed continuously and of relatively small size, so that the path of escaping moisture is short, resulting in a very dry product. I have found that when the moisture content of the corn syrup is reduced to approximately 5%, the rope is sufficiently stable to prevent collapse.

I have extruded corn syrup of 43° to 46° Bé. at a temperature which is at least its boiling point, through a variety of nozzles having a diameter of about 1/32 to 1/8 of an inch, into a chamber under vacuum, preferably on the order of 29" or higher, the dehydrated product obtained thereby having a moisture content as low as 2%.

In the drawings,

Figure 1 is a schematic side cross section showing the apparatus and process of my invention.

Figures 2, 3 and 4 are cross sectional views showing various nozzle types that I may employ for extruding.

Figure 5 is an enlarged cross section of the extruded corn syrup rope showing the open intercommunicating cell structure thereof.

Referring more specifically to the drawings in Figure 1 I show a suitable storage tank 10 which is adapted to hold a supply of 46° Baumé corn syrup under proper temperature and under desired pressure, which may be atmospheric or added pressure, as will be discussed later. The corn syrup is led through a suitable pipe 11 into a reservoir 12 which leads directly to the tubes 9. The tubes 9 are located in the chamber 14 which is heated by steam introduced therein by inlet pipe 15, condensed water being withdrawn through exit pipe 16. The pressure on the steam chest is 8 pounds, corresponding 234° F. or the boiling point of the syrup. The heated syrup passes through the tubes 9 to the nozzles 18 and flashes from the nozzles 18 into the vaccum chamber 17, the extruded corn syrup taking the general form of expanded solid cylindrical rope-like structure having open intercommunicating cells.

The chamber is held under a vacuum of 29" or better through vacuum pipe 13 in order to evaporate water from the expanded cylinder or rope, which because of its expanded form, i. e. a multiplicity of open intercommunicating cells, permits ready removal of the water. Substantially all of the moisture is removed instantaneously upon extrusion. Additional moisture may be removed from the ropes through further radiant heat supplied from the walls or through infra red lamps. The temperature of the receiver is kept between 100–130° F.

The expanded cylinders or rope eventually break of their own weight and fall on the mechanical conveyor 20 which breaks up the rope into a comminuted form so that the mass may be brought directly to the heating surface of jacket 21. Thus, the small amount of residual moisture may be further reduced. Steam enters the jacket 21 through inlet pipe 22 and the condensate is withdrawn through pipe 23.

In addition to comminuting the solid corn syrup, the conveyor also conveys the dehydrated and comminuted corn syrup to a storage passageway 24 which may be emptied through a vacuum type valve 25. This vacuum valve 25 may automatically and periodically discharge the solid dehydrated corn syrup from the apparatus without breaking the vacuum thereon.

Referring now more specifically to the supply tank 10, the corn syrup employed may be anywhere within the range of commercial syrups 43° to 46° wtih proper orifices, but I find it preferable to employ a corn syrup having a concentration of 46° Baumé which is the heaviest or densest syrup of present commercial production. It is understood that heavier or denser syrups could be employed but in accordance with the present day commercial practice, and taking into account the ordinary concentrating and evaporating pans, the practical difficulties of obtaining a higher concentration corn syrup are such as to make it undesirable with such existing apparatus. It is possible, however, by means of special equipment that a concentration of corn syrup higher than 46° Baumé could be employed.

The supply tank 10 is under atmospheric pressure. This tank may however be placed under increased pressure so as to enable temperature on the tubes 9 in the chest 14 to be increased correspondingly. The syrup extruding from the orifice 18 would be at a higher temperature with more available heat for evaporation of the water.

Although I may apply pressure to the corn syrup, the pressure is chiefly for the purpose of raising the boiling point of the corn syrup and thus enabling the application of greater heat to the corn syrup without the corn syrup boiling. Applied pressure is unnecessary as such because the extrusion is into a vacuum chamber and this vacuum is so set as to provide a sufficient pressure differential to move the syrup into the dehydration chamber at the necessary speed. Therefore, there is usually no necessity for additional applied mechanical pressure except as above set forth for the purpose of applying a higher heat to the corn syrup before extrusion or, in some cases, to effect a finer thread for expansion.

The temperatures employed on the corn syrup are always limited so as to prevent any deterioration of the corn syrup.

It is possible, however, that higher pressure could be obtained by small pumps on a small mass of corn syrup which would enable a high temperature on a correspondingly small mass of syrup for a short time before extrusion, thus preventing any harmful heating effects.

Although I can employ a number of different orifice diameters and tube lengths so as to give expanded cylinders or ropes ranging from 3/4 to 1/4" in diameter, I have found it desirable to have the corn syrup in form of relatively small diameter since dehydration can most effectively be effected because of the smaller distance from inside out that the moisture has to travel. The diameter of the orifice is by no means the sole control of the diameter of the extruded product, since I have found that an orifice having a diameter of 1/32" and a relatively short tube length produces an extruded product of greater diameter than an orifice having 1/16" in diameter and a relatively longer tube length. This is because the resistance encountered by the corn syrup in the tube of greater length allows a smaller quantity of corn syrup to be extruded and thus forms a smaller cylinder and allows for greater dehydration.

I have found that the most desirable tube and orifice for the extrusion of 46° Bé. corn syrup under little or no pressure is a tube having a length of about 4" and a tube and nozzle diameter of about 1/16". There is a further advantage in using such a tube and nozzle since tubes and orifices of such diameters can not be easily blocked by any solid foreign matter that might be accidentally included in the corn syrup.

In Figure 2, I show a cross section of a nozzle having a tapered surface 27 and a uniform bore 26 with some means 28 for attaching the tube and nozzle to the holder. The tapered nozzle head is desirable since it prevents the emerging expanding corn syrup from contacting the nozzle and being deformed or interfered with thereby. A smoother, more uniform flow and shape is thus obtained.

In Figure 3, I show a cross section of a modified form of this extrusion tube having a flat head 30 with a passageway 31 of relatively short length and smaller diameter than the passageway 26. To provide for the necessary flow, I provide for larger passageway 32 for the greater length of the tube.

In Figure 4 I show in cross section a nozzle 35 having a central bore 36 and a diverging or inverted cone shaped nozzle 37. Suitable screw thread means 38 are shown for attaching the nozzle in a holder. I have found this diverging shaped nozzle opening particularly desirable because I can thus govern the expanding corn syrup as it emerges from the nozzle. The corn syrup clings to the surface of the inverted cone nozzle and is thus formed, while expanding, to the desired cylindrical rope-like structure.

The cylinder or rope of solid corn syrup that forms instantaneously upon extrusion may have a diameter 10 times as great as the stream of corn syrup just prior to the extrusion. The expansion may vary from about five to fifteen times.

In Figure 5 I show a cross sectional view of the extruded solid dehydrated corn syrup in the form of a cylindrical mass 40. It will be noted that the cells 41 and 42 contained in this mass intercommunicate with each other so as to provide complete communication throughout the mass and between the interior of the mass and the surrounding vacuum.

By employing a battery of such extruders, I can continuously extrude corn syrup in solid form having a moisture content of as low as 2% upon extrusion and lower with supplemental heating. By employing a battery or multiplicity of such extruders, I can rapidly convert large quantities of liquid corn syrup to solid dehydrated form. The process involving as it does no high pressure apparatus, no atomization equipment and employing equipment of comparatively small size, is relatively low in capital cost and upkeep. The dehydration is effected under vacuum wherein moisture is removed at low cost.

I apply as much heat as possible to the corn syrup without causing it to boil so that the best drying effects are obtained upon extrusion. By raising the pressure on the corn syrup I can increase the amount of heat therein without causing the corn syrup to boil. The high vacuum recited is necessary to obtain the expansion into open cell form. The open cell form of dry corn syrup obtained by this continuous process is very desirable since a well dehydrated, readily soluble solid corn syrup is obtained.

Various other modifications of my invention will suggest themselves to those skilled in the art. I accordingly desire that in construing the breadth of the appended claims that they shall not be limited to the specific details shown and described in connection with the above explanation.

I claim:

1. The method of producing a solid dehydrated corn syrup which comprises heating liquid corn syrup sufficiently so that upon extrusion into the presence of a high vacuum, said heated corn syrup will expand and solidify; extruding said heated corn syrup into the pressure of a high vacuum to expand said corn syrup and dehydrate said corn syrup to solid form.

2. The method of producing a solid dehydrated corn syrup which comprises heating liquid corn syrup sufficiently so that upon extrusion into the presence of a high vacuum, said heated corn syrup will expand and solidify; extruding said heated corn syrup into a vacuum chamber evacuated to about 29" of vacuum to expand said corn syrup in the form of a solid cylindrical rope-like structure having intercommunicating cells.

3. The method of producing a solid dehydrated corn syrup which comprises heating liquid corn syrup of from 43° to 46° Baumé under such pressure that when extruded into the presence of a high vacuum, the heated liquid corn syrup will expand and solidify to an intercommunicating cell structure and extruding said heated corn syrup through a nozzle into a vacuum chamber evacuated to about 29" of vacuum to expand said corn syrup and set said expanded extruded corn syrup in the form of a solid cylindrical rope-like structure having intercommunicating cells and having a moisture content of about 5%.

4. The method of producing a solid dehydrated corn syrup which comprises heating liquid corn syrup of from 43° to 46° Baumé under such pressure that when extruded into the presence of a high vacuum, the heated liquid corn syrup will expand and solidify to an intercommunicating cell structure and extruding said heated corn syrup through a nozzle into a vacuum chamber evacuated to about 29" of vacuum to expand said corn syrup and set said expanded extruded corn syrup in the form of a solid cylindrical rope-like structure having intercommunicating cells and having a moisture content of about 5%; and applying heat to said expanded corn syrup to dehydrate it to about 2% moisture.

5. The method of producing a solid dehydrated corn syrup which comprises heating liquid corn syrup of from 43° to 46° Baumé under such pressure that when extruded into the presence of a high vacuum, the heated liquid corn syrup will expand and solidify to an intercommunicating cell structure and extruding said heated corn syrup through a nozzle into a vacuum chamber evacuated to about 29" of vacuum to expand said corn syrup and set said expanded extruded corn syrup in the form of a solid cylindrical rope-like structure having intercommunicating cells; applying heat to said expanded corn syrup to further dehydrate it; and comminuating said sol'd corn syrup.

6. The method of producing a solid dehydrated corn syrup which comprises heating liquid corn syrup of from 43° to 46° Baumé under such pressure that when extruded into the presence of a high vacuum, the heated liquid corn syrup will expand and solidify to an intercommunicating cell structure and extruding said heated corn syrup through a nozzle into a vacuum chamber evacuated to about 29" of vacuum to expand said corn syrup and set said expanded extruded corn syrup in the form of a solid cylindrical rope-like structure having intercommunicating cells; applying heat to said expanded corn syrup to further dehydrate it; comminuting said solid corn syrup; and discharging said comminuted dehydrated solid corn syrup without substantially interfering with the vacuum condition in said vacuum chamber.

7. The method of producing a solid dehydrated corn syrup which comprises heating liquid corn syrup of high concentration under such pressure that when extruded into the presence of a high vacuum, the heated liquid corn syrup will expand and solidify to an intercommunicating cell structure; extruding said heated corn syrup through a nozzle having a tapered head into a vacuum chamber evacuated to about 29" of vacuum to expand said corn syrup and set said expanded extruded corn syrup in the form of a solid cylindrical rope-like structure having intercommunicating cells.

8. The method of producing a solid dehydrated corn syrup which comprises heating liquid corn syrup of high concentration under such pressure that when extruded into the presence of a high vacuum, the heated liquid corn syrup will expand and solidify to an intercommunicating cell structure; extruding said heated corn syrup through a nozzle having an opening in the shape of an inverted cone into a vacuum chamber evacuated to about 29" of vacuum to expand said corn syrup and set said expanded extruded corn syrup in the form of a solid cylindrical rope-like structure having intercommunicating cells.

9. The method of producing a solid dehydrated corn syrup which comprises heating liquid corn syrup of from 43° to 46° Baumé under such pressure that when extruded into the presence of a high vacuum, the heated liquid corn syrup will expand and solidify to an intercommunicating cell structure; extruding said heated corn syrup into a vacuum chamber evacuated to about 29" of vacuum to expand said corn syrup and set said expanded extruded corn syrup in the form of a solid cylindrical rope-like structure having intercommunicating cells; applying heat to said expanded corn syrup to further dehydrate it; comminuting and conveying said solid corn syrup; and heating said solid corn syrup while conveying it to further dehydrate it.

10. The method of continuously producing corn syrup solids which comprises heating liquid corn syrup under atmospheric pressure to a temperature just below the boiling point of the corn syrup in order to store heat therein and extruding said heated liquid corn syrup into the presence of a high vacuum, the vacuum being such that the heat stored in the corn syrup causes the corn syrup to flash boil into a continuous expanded structure comprising dehydrated corn syrup having a moisture content of from one to six per cent.

11. The method of continuously producing corn syrup solids which comprises heating liquid corn syrup under atmospheric pressure to a temperature just below the boiling point of the corn syrup in order to store heat therein and extruding said heated liquid corn syrup into the presence of a high vacuum, the vacuum being such that the heat stored in the corn syrup causes the corn syrup to flash boil into a continuous expanded structure comprising dehydrated corn syrup having a moisture content of from one to six per cent, and comminuting said solid expanded corn syrup and applying additional heat thereto to further reduce the moisture content of said solid expanded corn syrup.

12. The method of continuously producing corn syrup solids which comprises heating liquid corn syrup under atmospheric pressure to a temperature just below the boiling point of the corn syrup in order to store heat therein and extruding said heated liquid corn syrup into the presence of a high vacuum, the vacuum being such that the heat stored in the corn syrup causes the corn syrup to flash boil into a continuous expanded intercommunicating cell structure comprising dehydrated corn syrup having a moisture content of from one to six per cent.

13. The method of continuously producing corn syrup solids which comprises heating liquid corn syrup under higher than atmospheric pressure in order to secure a greater amount of heat stored in the liquid corn syrup than is possible at atmospheric pressure, and extruding said heated liquid corn syrup into the presence of a high vacuum, the vacuum being sufficiently high so that the stored heat causes the liquid corn syrup to flash boil into a continuous expanded structure of dehydrated corn syrup having a moisture content of from one to six per cent.

14. The method of continuously producing corn syrup solids which comprises heating liquid corn syrup under higher than atmospheric pressure in order to secure a greater amount of heat stored in the liquid corn syrup than is possible at atmospheric pressure, and extruding said heated liquid corn syrup into the presence of a vacuum of about 29" so that the stored heat causes the liquid corn syrup to flash boil into a continuous expanded structure of dehydrated corn syrup having a moisture content of from one to six per cent.

15. The method of producing a corn syrup solid which comprises heating liquid corn syrup of commercial Baumé of from 43° to 46° at atmospheric pressure to a temperature of between 200° F. and the boiling point of the corn syrup, in order to store heat therein, and extruding the heated liquid corn syrup through a nozzle into the presence of a vacuum of from 28 to 29½ inches so that the heated liquid corn syrup flash boils into a continuous expanded rope-like structure of dehydrated corn syrup having intercommunicating cells and a moisture content of from one to six per cent.

16. The method of producing corn syrup solids which comprises heating liquid corn syrup of a commercial Baumé of from 43° to 46° under greater than atmospheric pressure to a temperature of from 232° to 350° F. and extruding said heated liquid corn syrup through a nozzle into the presence of a vacuum of from 28 to 29½ inches so that the corn syrup flash boils into a continuous expanded rope-like structure of dehydrated corn syrup having intercommunicating cells and having a moisture content of from one to six per cent.

WALTER R. FETZER.

REFERENCES CITED

The following references are of record in the file of this patent:

UNITED STATES PATENTS

| Number | Name | Date |
|---|---|---|
| 2,192,951 | Wolff | Mar. 12, 1940 |
| 2,192,952 | Wolff | Mar. 12, 1940 |
| 2,149,517 | Fleming | Mar. 7, 1939 |
| 2,098,604 | Whymper | Nov. 9, 1937 |
| 2,245,309 | Walsh | June 10, 1941 |
| 1,826,701 | Ames | Oct. 13, 1931 |
| 2,189,824 | Walsh | Feb. 13, 1940 |
| 2,155,374 | Hartog | Apr. 18, 1939 |
| 2,327,351 | Heyman | Aug. 24, 1943 |